Feb. 17, 1970  J. R. STEPHENS ET AL  3,495,301
TUBE EXPANDING APPARATUS
Filed June 23, 1967  3 Sheets-Sheet 1

INVENTORS
J. R. STEPHENS
O. E. LARSEN
BY Young & Quigg
ATTORNEYS

INVENTORS
J. R. STEPHENS
O. E. LARSEN

ATTORNEYS

INVENTORS
J. R. STEPHENS
O. E. LARSEN
BY Young & Quigg
ATTORNEYS

3,495,301
TUBE EXPANDING APPARATUS
James R. Stephens and Olaf E. Larsen, Bartlesville, Okla., assignors to Phillips Petroleum Company, a corporation of Delaware
Filed June 23, 1967, Ser. No. 648,308
Int. Cl. B29c 17/02
U.S. Cl. 18—19          11 Claims

ABSTRACT OF THE DISCLOSURE

An apparatus for expanding at least one end of a length of plastic tubing. A stripper plate is positioned perpendicular to the leading end of a flaring mandrel and has an opening through which the leading end of the mandrel extends during the expanding operation. This opening is smaller than the outer diameter of an expanded tube end and thereby strips of the flared end from the mandrel when the mandrel is retracted.

---

This invention relates to tube expanding. In another aspect, this invention relates to an improved apparatus for expanding the ends of plastic tube. In still another aspect, this invention relates to an improved apparatus for making plastic tube couplings.

The demand for piping made from thermoplastic resins has increased substantially in recent years. Piping made from these resins has the advantages of strength, durability, corrosion resistance, and light weight. However, difficulties have generally been encountered when coupling lengths of pipe made from these thermoplastic resins. Coupling of two plastic tube lengths many times requires the expanding of at least one end of a tube when, for example, sockets, joints, adhesive bonding, or solvent welding is to be used, or the thickening of a tube end which, for example, is to be threaded. It is generally desirable to connect the outer periphery of a tube portion to the inner periphery of an expanded portion by adhesive or solvent welding.

One object of this invention is to provide an improved apparatus for expanding the ends of plastic tubing.

Another object of this invention is to provide an improved apparatus for making tube couplings particularly suitable for coupling plastic tubes by solvent welding and adhesive.

According to one embodiment of this invention, an apparatus is provided for expanding the end of a length of thermoplastic tubing which includes a frame carrying a pressure plate and a reciprocally mounted expanding mandrel in spaced relationship. A stripper plate which is mounted on the frame adjacent the leading end of the mandrel, preferably being resiliently mounted on the frame, carries an aperture adapted to receive the leading end of the mandrel so that the said leading end will extend therethrough when the mandrel is so extended. This aperture is smaller in diameter than the outer diameter of the tube after it has been expanded. The trailing end of the mandrel is adapted to contact the stripper plate and carry it forward, when it is resiliently mounted, as the mandrel is extended. To operate the apparatus, one end of a length of plastic tubing is heated. The tubing is placed between the pressure plate and the stripper plate with the heated end adjacent and in axial alignment with the aperture through the stripper plate. The expanding mandrel is extended through the aperture into the heated end of the tubing thereby expanding same. After the expanded nd is cooled, the mandrel is withdrawn and the stripper plate contacts the expanded end and strips it from the retracting mandrel.

According to another embodiment of this invention, two resiliently mounted stripper plates, as described above, are mounted on said frame in spaced relationship. Two reciprocally mounted expanding mandrels are positioned adjacent the respective stripper plates and cooperate therewith a manner as described above. Each respective stripper plate and expanding mandrel is movable on the frame with respect to the other stripper plate and mandrel and thereby adjustable to expand both ends respectively of various lengths of tubing.

According to still another embodiment of this invention, the above apparatus is adapted to produce a short conduit coupling. The two expanding mandrels comprise blunt cylindrical or slightly conical mandrel means, each having a length slightly less than one-half the length of the short coupling. Thus, when the mandrels are fully extended, they will substantially fill the entire tube length. A pair of conical pre-flaring mandrels, at least one of which is reciprocally mounted are positioned adjacent the expanding mandrels and are adapted to pre-flare both ends of the short heated tube to be expanded so that each will fit over the leading blunt end of each expanding mandrel.

This invention can be more easily understood from a study of the drawings in which.

Figure 1:
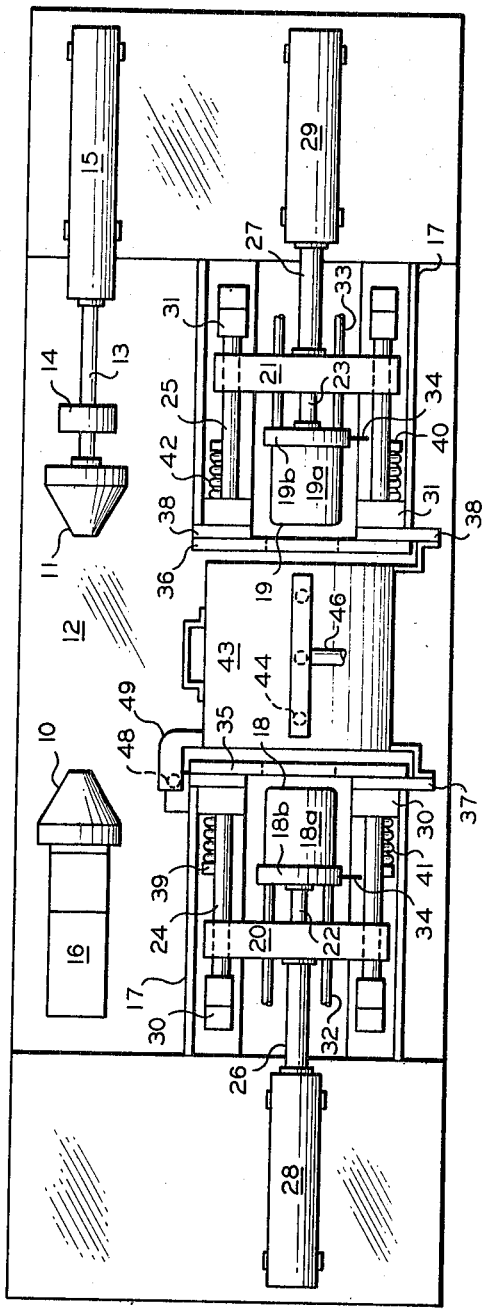
FIGURE 1 is a plan view of a preferred apparatus of this invention for making plastic tube couplings.
Figure 2:
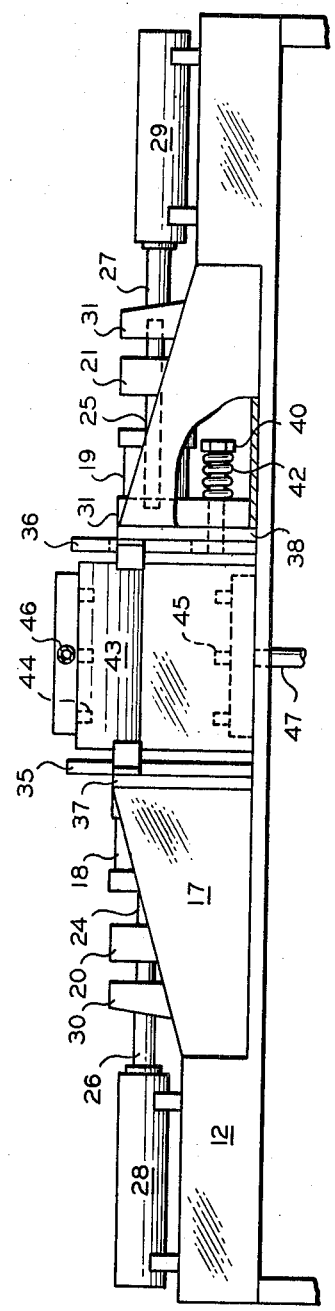
FIGURE 2 is an elevation view partly in section of the apparatus of FIGURE 1.

FIGURES 1 and 2 illustrate an apparatus adapted to produce couplings for plastic tubes. This apparatus can be used to form couplings, each of which comprises a generally expanded section of plastic tubing. This thermoplastic tubing can be made from any thermoplastic resin known in the art. Examples of suitable thermoplastic resins include polymers and copolymers of *l*-olefins such as ethylene and propylene, vinyl resins such as polyvinyl chloride and acrylonitrile-butadiene-styrene. Thus, when it is desired to couple the ends of two plastic tubes, the respective ends of the tubes to be coupled can be coated with a suitable solvent or adhesive and forced into either end of the coupling made by the apparatus of this invention. The action of the solvent or adhesive will join the outer walls of the pipe ends to the inner walls of the coupling. Any solvent or adhesive known in the art can be used for this purpose. For example, when joining tubes made of polyvinyl chloride, suitable solvents include tetrahydrofuran, cyclohexanone, and dimethylformamide.

Now, referring to FIGURES 1 and 2 in detail, pre-flaring mandrels 10 and 11 are shown mounted in spaced relationship on table 12. Mandrels 10 and 11 are conical mandrels, preferably from about 30–120°. As shown, pre-flaring mandrel 11 is connected to shaft 13 which, in turn, is reciprocally mounted through bearing member 14. Shaft 13 connects to a piston within air cylinder 15. Pre-flaring mandrel 10 is fastened to table 12 by support member 16. Frame 17 is positioned adjacent pre-flaring mandrels 10 and 11 on table 12 and carries a pair of opposed expanding mandrels 18 and 19. Expanding mandrels 18 and 19 are connected to sliding blocks 20 and 21 by rods 22 and 23 respectively. Sliding blocks 20 and 21 move on rods 24 and 25 in response to piston rods 26 and 27 of air cylinders 28 and 29 respectively. Rods 24 and 25 are supported between support members 30 and 31 respectively. Mandrels 18 and 19 comprise forming sections 18a and 19a respectively and stops 18b and 19b respectively. Expanding mandrels 18 and 19 are hollow and coolant conduits 32 and 33 respectively connect to the internal cavities therein. Air outlet 34 connects with conduits communicating through the leading end of each mandrel respectively and will be explained in more detail below.

Stripper plates 35 and 36 have apertures therethrough which are aligned with mandrels 18 and 19 respectively. These apertures are slightly larger in diameter than the diameters of forming sections 18a and 19a. Stripper plates 35 and 36 are held against stopping members 37 and 38 by the action of rods 39 and 40 and springs 41 and 42 respectively.

As shown in FIGURE 2, rod 40 is connected to stripper plate 36 and slidably mounted through stopping member 38 and support member 31. Spring 42 rests between support member 31 and the outer flange of rod 40.

Hood 43 is hinged on stops 37 and 38 and carries downward projecting spray nozzles 44. Upward projecting spray nozzles 45 are attached to frame 12 opposite nozzles 44 as illustrated in FIGURE 2. Conduits 46 and 47 supply a coolant such as water to spray nozzles 44 and 45 respectively. Conduits 46 and 47 lead to a common on-off valve (not shown in FIGURES 1 and 2), which is actuated by contact switch 48 (FIGURE 1). Arm 49 which is attached to hood 43 strikes contact switch 48 as the hood is lowered to the position as illustrated in FIGURES 1 and 2. This action will actuate the valve connected to conduits 46 and 47 and allow a cooling fluid to flow therethrough to nozzles 44 and 45. As hood 43 is moved upward, arm 44 will lose contact with switch 48 and the flow of fluid through nozzles 44 and 45 will thereby stop.

In an alternate arrangement, hood 43 is not used and nozzles 44 are positioned between stripper plates 35 and 36. When this arrangement is used, contact switch 43 is placed adjacent stripper plate 35 and positioned so that stripper plate 35 will contact and thereby actuate it when mandrel 18 is fully extended.

Figure 4:
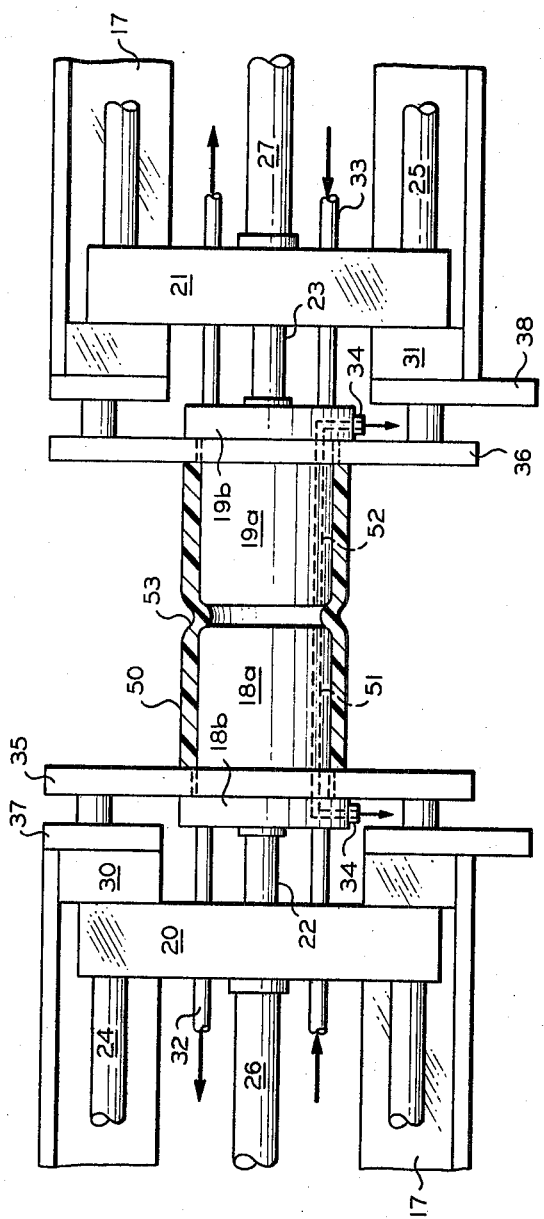
FIGURES 3 and 4 are illustrations partly in section showing operation of the apparatus of FIGURES 1 and 2.
Figure 3:
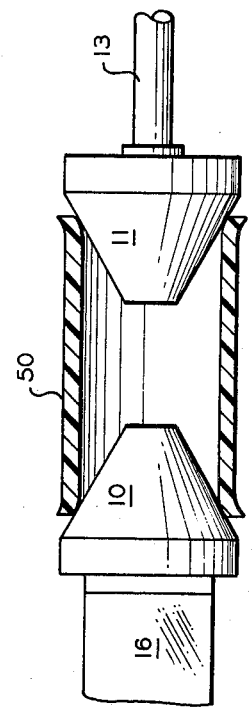

The operation of the above-described apparatus will next be illustrated with reference to FIGURES 1 through 4. Initially, a plastic tube made of polyvinyl chloride, for example, is heated to a moldable temperature by suitable means such as infrared lamps, or electric resistance heaters, or a bath of a hot inert liquid such as glycerin. The hot tube is then lifted by a suitable means such as tongs and the like and held concentric against the leading end of mandrel 10. Air cylinder 15 is actuated by a foot operated valve (not shown), and causes mandrel 11 to advance and contact the outer end of the plastic tube. This latter action causes both ends of the tube 50 to become slightly flared as illustrated in FIGURE 3. This action will thereby allow the outer ends of tube 50 to fit over the leading ends of mandrels 18 and 19. After this pre-flaring operation, mandrel 11 is retracted and the pre-flared tube is placed between stripper plates 35 and 36 and aligned concentrically with the apertures therethrough. Air cylinders 28 and 29 are then actuated by a foot operated valve (not shown), thereby causing forming sections 18a and 19a of mandrels 18 and 19, respectively, to move forward through the apertures in stripper plates 35 and 36, respectively, and into the pre-flared ends of tube 50. As tube 50 becomes expanded by the action of opposed forming sections 18a and 19a, it will thereby shrink somewhat in length; however, as stops 18b and 19b contact stripper plates 35 and 36, the respective stripper plates are moved forward with the moving mandrels until the mandrels are fully extended as illustrated in FIGURE 4. It is noted that mandrels 18 and 19 have air conduits 51 and 52 therethrough which exhaust air from the interior of tube 50 as the mandrels are advanced to the position illustrated in FIGURE 4. This exhaust of air pressure results in the indentation 53 around the middle of the resulting coupling which serves as a stop when the ends of two conduits are inserted therein. It is noted that forming sections 18a and 19a can either be cylindrical, or blunt very slightly conical sized sections. For solvent welding applications the finished fitting should have an opening larger in diameter than the pipe at the socket entrance and smaller than the pipe at the bottom of the socket. This provides an "interference fit" which establishes intimate contact of the surfaces to be bonded. For adhesive bonding applications, the sockets should provide a positive clearance for the entire socket depth.

A cooling fluid such as tap water flows through the inner cavities of mandrels 18 and 19 as illustrated in FIGURE 4 and serves to cool the interior of the hot thermoplastic material. Hood 43 is next lowered and arm 49 strikes contact switch 48 thereby causing water to spray from nozzles 44 and 45 (FIGURE 2) to thereby cool the outer surface of the expanded tube 50. This action hardens the tube 50 so that it will remain in the configuration as illustrated in FIGURE 4 after mandrels 18 and 19 are moved therefrom.

After the expanded tube 50 is cooled, hood 43 is raised and mandrels 18 and 19 are retracted by air cylinders 28 and 29. As mandrels 18 and 19 are retracted, stripper plates 35 and 36 will be pulled back against stopping members 37 and 38 by the action of springs 41 and 42. The ends of expanded tube 50 will contact one and/or both of the stripper plates during this mandrel retracting operation and this will allow the mandrels to be stripped from the inside of the expanded tube 50. This stripping operation is necessary because the cooled expanded tube 50 will fit very snugly around forming sections 18b and 19b of mandrels 18 and 19 and must be forced therefrom.

Figure 5:
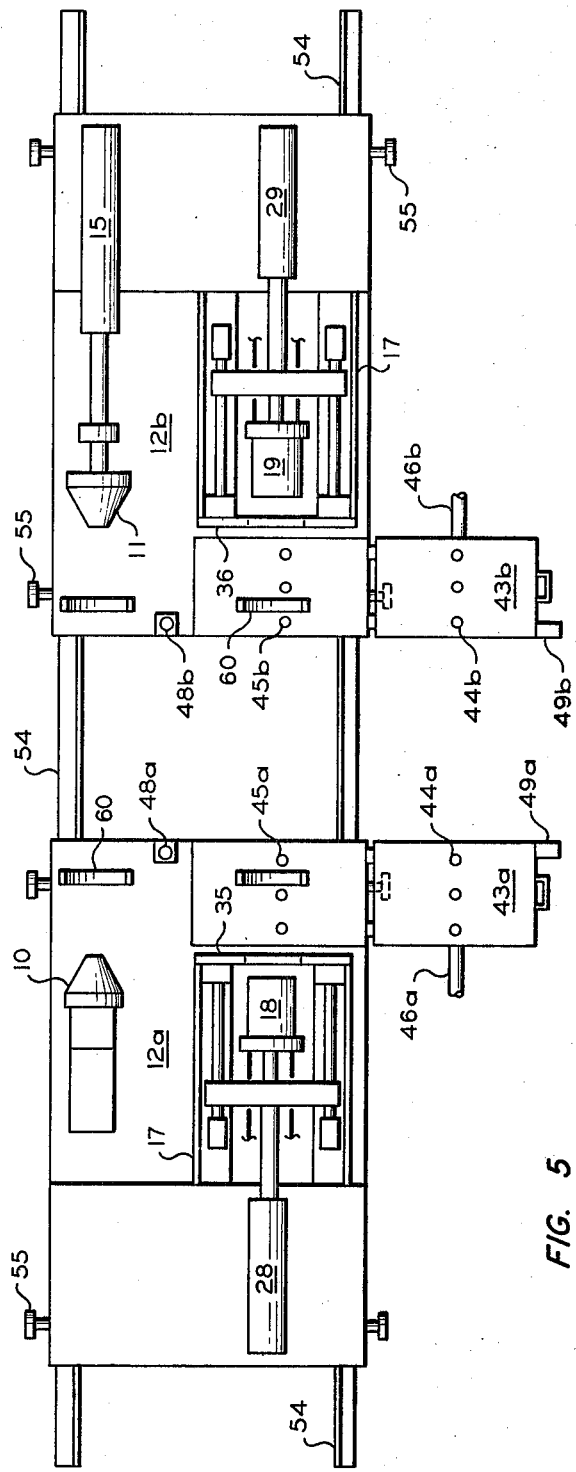
FIGURE 5 is a plan view of another embodiment of this invention.
Figure 6:
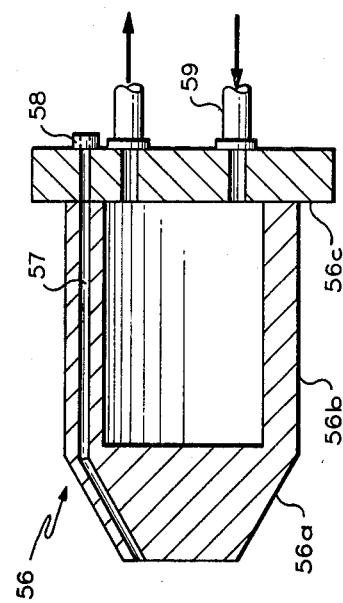
FIGURE 6 is a sectional view of a mandrel means particularly adapted for use with the apparatus of FIGURE 5.

FIGURE 5 is an illustration of another embodiment of this invention suitable for flaring one or both ends of a plastic tube length. As illustrated, in this embodiment, table 12 (FIGURES 1 and 2) is cut to form two movable tables, 12a and 12b, which are slidably mounted on rods 54. Set screws 55 when tightened will hold tables 12a and 12b in a fixed spaced relationship. Hoods 43a and 43b are pivotally mounted on tables 12a and 12b respectively. When it is desired to form the short couplings in the operation as illustrated in FIGURES 3 and 4, tables 12a and 12b are pushed together on rails 54 to form an apparatus substantially the same as the apparatus as illustrated in FIGURES 1 and 2. When it is desired to expand one or both ends of longer tube lengths; mandrels 18 and 19 can be replaced by mandrels having a configuration as illustrated as mandrel 56 in FIGURE 6. Mandrel 56 comprises a leading conical shaped end 56a, a forming section 56b which is similar to forming sections 18b and 19b of FIGURES 1 and 2, and a stopping section 56c. Air conduit 57 communicates between the leading end of mandrel 56 and coupling 58, coolant conduits 59 communicate with the cavity within mandrel 56. Thus, when it is desired to flare both ends of a longer tube length of say three feet, tables 12a and 12b are initially spaced so that the three-foot tube length can be positioned between stripper plates 35 and 36, mandrels 18 and 19 are replaced by mandrels 56 and both ends of the tube lengths are heated to a moldable condition. The tube is then placed on mounts 60 which hold the tube so that either end thereof is in axial alignment with the apertures through stripper plates 35 and 36. Cylinders 28 and 29 are then actuated by a foot operated valve (not shown), causing mandrels 56 to enter and expand both ends of the tube. Leading sections 56a of mandrels 56 will expand the ends of the plastic tube sufficiently to allow forming sections 56b to enter and enlarge the respective end sections as desired. Hoods 43a and 43b are closed causing arms 49a and 49b to contact switches 48a and 48b which in turn cause water from conduits 46a and 46b to be sprayed through nozzles 44a and 45a and 44b and 45b.

If it is desired to expand only one end of a particular length of tubing, then only one of the air cylinders, 28 or 29, may be operated. When this is done, the stripper plate opposite the actuating air cylinder will be a blank plate and act as a back pressure plate against a non-heated end of the plastic tubing. It is readily seen that an apparatus for flaring only one end of a plastic tube can be provided wherein one of the movable tables of FIGURE 5, for example, table 12a carries only a single back pressure plate adjacent a tube support 60.

It must be noted that this invention is not intended to be limited to the embodiments disclosed and described herein and that many alterations and variations can be made of this basic invention by one skilled in the art from a reading of this disclosure. For example, it is noted that stripper plates 35 and 36 in FIGURE 5 need not be resiliently mounted on frames 17a and 17b, but can be fastened thereto by bolts or other suitable means. However, it is generally preferred to use resiliently mounted stripper plates, especially when making the shorter conduit coupling by the apparatus of FIGURE 1. Also, in some instances, it may be desirable to introduce a forming fluid through air conduit 57 of mandrel 56 or through air conduits 51 and 52 of mandrels 18 and 19 respectively. This is especially true when expanding the ends of intermediate tube lengths wherein the heating operation not only heats the ends of the tubes to be expanded but also a substantial length of the tubing intermediate the ends which is not to be expanded. As is readily seen, this positive pressure will prevent the intermediate section between the two expanded ends from collapsing as pressure is applied upon the two tube ends by the respective mandrels and/or the stripper plates.

The following example is given to better facilitate the understanding of this invention.

EXAMPLE

An apparatus similar to the apparatus as illustrated in FIGURES 1 and 2 was used to expand lengths of tubing made from polyvinyl chloride having outside diameters of 2⅜ inches and lengths of 5⅞ inches. Stripper plates 35 and 36 were positioned 7⅛ inches apart and each was capable of extending 1½ inches from stopping means 37 and 38 respectively. Preflaring mandrels 10 and 11 comprise two 45° conical mandrels. Forming sections 18a and 19a of mandrels 18 and 19 were slightly conical, each having sides with diameters of 2.380 inches at the leading edge to 2.390 inches at the mandrel stop, the forming surface being 2.469 inches long. The apertures through stripping plates 35 and 36 were 2.650 inches in diameter.

Initially, the polyvinyl chloride tube lengths were heated to 260° F. in a vat or hot glycerin. Respective tube lengths were removed from the glycerin by hand tongs and placed between pre-flaring mandrels 10 and 11. Pre-flaring mandrel 11 was actuated to thereby flare both ends of the polyvinyl chloride tube. The resulting inside diameter of the flared ends of the polyvinyl chloride tube was 2⁷⁄₁₇ inches in diameter. The hot pre-flared tube was then placed between stripper plates 35 and 36 and axially aligned with the respective apertures therethrough. Air cylinders 28 and 29 were actuated and fully extended to a position as illustrated in FIGURE 4. Tap water of 65° F. was flowing into the inner cavities of mandrels 18 and 19 at this time.

Next, hood 43 was depressed until arm 49 contacted switch 48. This latter action caused tap water of 65° F. to spray from nozzles 44 and 45 and contact the outer periphery of the expanded polyvinyl chloride tube. This spray continued for ten seconds until hood 43 was lifted. Mandrels 18 and 19 were next retracted and the resulting conduit coupling was removed from between stripper plates 35 and 36. This resulting conduit coupling was 5 inches long and had a nominal inside diameter of 2⅜ inches and a nominal outside diameter of 2¾ inches. An indentation, ⅜ inch wide, encircled the middle of the coupling as illustrated in FIGURE 4.

We claim:

1. Tube expanding apparatus comprising in combination:
   (a) a frame means carrying a first and second stripper plate means in spaced relation so that tube lengths can be positioned therebetween, each of said stripper plate means having an aperture therethrough which has a smaller diameter than the outer diameter of the tube end after it has been expanded, said stripper plate means being axially movable over a limited area;
   (b) first and second mandrel means movably positioned adjacent each of said stripper plates, said mandrel means being aligned with said apertures and adapted to extend therethrough and expand the ends of the tube, said mandrels being concentrically aligned with the tube length and having a leading forming section and a trailing stop section, said stop section being disposed so as to contact the outer portion of said stripper plate during forward movement of said mandrel; and
   (c) first and second stop means carried by said frame which stop means limit backward axial movement of said stripper plates as said mandrels are retracted.

2. Apparatus according to claim 1 wherein each of said stripper plates is spring biased toward said stop section of said mandrel and moves with said mandrel when contacted by said stop section as said mandrel is extended.

3. Apparatus of claim 2 further comprising means to cool the expanded ends of a tube when said mandrel is extended therein.

4. Apparatus of claim 2 wherein said mandrels each have one leading zone comprising a blunt, very slightly conical zone.

5. Apparatus of claim 4 wherein said mandrels are hollow and have means for introducing and withdrawing a cooling fluid communicating with the inner cavities thereof.

6. Apparatus of claim 5 wherein each of said mandrels has at least one annulus extending through the wall section which communicates between the leading end of the respective mandrel and the trailing end thereof.

7. Apparatus of claim 6 further comprising at least one spray nozzle positioned upward between said stripper plates and a hood means pivotally mounted adjacent said stripper plates so that it can be positioned over the space between said stripper plates, and at least one spray nozzle attached to said hood means and adapted to spray into said space when said hood means is positioned thereover.

8. Apparatus of claim 2 further comprising a pair of conical pre-flaring mandrels carried by said frame, at least one of which being reciprocally mounted, said pair of pre-forming mandrels positioned adjacent said flaring means.

9. The apparatus of claim 4 wherein, (1) said first stripper plate and said first mandrel, and (2) said second stripper plate and said second mandrel are movably positioned on a sliding rail means.

10. The apparatus of claim 9 wherein each of said mandrels has two leading zones comprising a first sharply conical zone, the base of which communicates concentrically with an elongated very slightly conical zone.

11. The apparatus of claim 10 wherein said mandrels are hollow and have means for introducing and withdrawing cooling fluid communicating with their inner cavities attached through the trailing zone thereof.

References Cited

UNITED STATES PATENTS

| | | |
|---|---|---|
| Re. 19,000 | 11/1933 | Scribner. |
| 1,251,175 | 12/1917 | Boyer. |
| 1,486,641 | 3/1924 | Dasher. |
| 1,661,367 | 3/1928 | Helminials. |
| 2,433,546 | 12/1947 | Cornelius. |
| 2,974,367 | 3/1961 | Doering et al. |
| 3,089,190 | 5/1963 | Branham. |
| 3,248,756 | 5/1966 | Mills et al. |
| 3,360,826 | 1/1968 | Lorang. |
| 3,383,750 | 5/1968 | Schroeder et al. |

WILLIAM J. STEPHENSON, Primary Examiner

U.S. Cl. X.R.

18—2